United States Patent [19]

Audeh et al.

[11] Patent Number: 4,985,220
[45] Date of Patent: Jan. 15, 1991

[54] HYDROGEN FLUORIDE VAPOR CONTAINMENT

[75] Inventors: Costandi A. Audeh, Princeton; Saverio G. Greco, Princeton Junction, both of N.J.

[73] Assignee: Mobil Oil Corporation, Fairfax, Va.

[21] Appl. No.: 229,668

[22] Filed: Aug. 8, 1988

[51] Int. Cl.$^5$ ................................................ C01B 7/00
[52] U.S. Cl. .................................... 423/240; 423/483; 585/723; 585/724; 585/725; 585/854
[58] Field of Search ................ 423/240, 483; 585/725, 585/724, 723, 853, 854

[56] References Cited

U.S. PATENT DOCUMENTS

| | | | |
|---|---|---|---|
| 3,660,019 | 5/1972 | Predikant et al. | 423/240 |
| 3,699,209 | 10/1972 | Ward | 423/240 |
| 3,743,704 | 7/1973 | West | 423/240 |
| 4,154,804 | 5/1979 | Walker et al. | 423/240 |
| 4,175,375 | 11/1979 | Holehouse | 423/240 |
| 4,210,460 | 7/1980 | Seidenberger | 134/7 |
| 4,552,624 | 11/1985 | Clarkson | 204/1 T |
| 4,623,528 | 11/1986 | Barber | 423/240 |

FOREIGN PATENT DOCUMENTS 1421798  1/1976  United Kingdom ................ 585/854

OTHER PUBLICATIONS

Matheson Gas Data Book, 5th Ed., pp. 305–309.
1982 Hazardous Material Spills Conference Proceedings, 1982, pp. 363–365.
Kirk-Othmer Encyclopedia of Chemical Technology, 3rd Ed., vol. 1, pp. 624, 654–655.
Gordon K. Braley, Several Remedies for the Treatment of Spillages of Liquid Hazardous Chemicals, pp. 103–108.

Primary Examiner—Asok Pal
Attorney, Agent, or Firm—Alexander J. McKillop; Charles J. Speciale; Malcolm D. Keen

[57] ABSTRACT

A method of containing a hydrofluoric acid spill which includes the steps of detecting the spill, drenching the hydrofluoric acid spill area with an aqueous drench, drenching the hydrofluoric acid area with an aqueous solution composed of at least one foam generating surfactant, a foam stabilizer and a phase transfer agent. The drenching steps may be performed in sequence or concurrently.

16 Claims, 1 Drawing Sheet

HYDROGEN FLUORIDE VAPOR CONTAINMENT

FIELD OF THE INVENTION

This invention relates to a method and apparatus for the containment of a hydrogen fluoride vapor cloud.

BACKGROUND OF THE INVENTION

Hydrogen fluoride, or hydrofluoric acid (HF) is highly toxic and corrosive. However, it is used as a catalyst in isomerization, condensation, polymerization and hydrolysis reactions.

The petroleum industry uses anhydrous hydrogen fluoride primarily as a liquid catalyst for the alkylation of olefinic hydrocarbons to produce alkylate for increasing the octane number of gasoline. It is estimated that the U.S. petroleum alkylation industry uses 5% of the HF produced in the U.S. Its importance and acceptance is evidenced by the fact that in 1978 U.S. refiners scheduled eight new HF alkylation plants with a total capacity of 7,950 $m^3$ (50,000 barrels) of alkylate per day. The total U.S. HF alkylation capacity in 1984 was 69,160 $m^3$ (435,000 barrels) per day, and 0.43 to 1.0 kg of HF were used per cubic meter of alkylate.

Years of experience in its manufacture and use have shown that HF can be handled safely, provided the hazards are recognized and precautions taken. Though many safety precautions are taken to prevent leaks, massive or catastrophic leaks are feared primarily because the anhydrous acid will fume on escape creating a vapor cloud that can be spread for some distance.

A number of qualitative methods have been proposed for treating HF spills. The most common method is the use of a simple water drench system. Kirk-Othmer: Encyclopedia of Chemical Technology 3rd Edition, Volume 1, page 655 reports that "water, the most common absorption liquid is used for removing acidic gases...especially if the last contact is with water of alkaline pH". However, because of the aerosol nature of the HF cloud, i.e., the HF droplets in such a cloud are very small compared to the droplets of water in a simple water drench, the water drench generally cannot remove all the HF present in the cloud.

U.S. Pat. No. 4,210,460 relates to treating an HF liquid spill by applying to the spill a quantity of an aqueous solution of calcium acetate equal to at least seven times the estimated volume of the spill, and thereafter treating the spill with powdered magnesium oxide and a pH indicator such as bromothymol blue. After the mixture reaches a persistent blue color, indicating a safe state, the spill is cleaned up mechanically.

At the 1982 Hazardous Material Spills Conference, Edward C. Norman of National Foam System Inc. reported the application of limestone and then CHF-784 foam (a proprietary composition) to the contents of a damaged tank emitting an HF cloud. An immediate reduction in fume evolution was apparent after the foam application.

Gordon K. Braley, at the proceedings of the 1980 National Conference on Control of Hazardous Material Spills, in Louisville, Ky. on May 15, 1980 reported the treatment of relatively small amounts of controlled liquid spills of anhydrous hydrogen fluoride with high molecular weight polymers including polyacrylamide, polymethyl methacrylate, and polyvinyl alcohol. These materials applied in the form of a bead polymer formed a "skin" over the spill preventing fuming of the liquid. Polyacrylamide was deemed the most effective skin-forming agent.

Of the art cited above, only Edward C. Norman discusses an alleged successful treatment of a cloud containing HF. However, the composition used to treat such a cloud is not disclosed t the public.

The present invention was devised to provide an effective method and apparatus for containing an HF cloud.

SUMMARY OF THE INVENTION

The invention provides a qualitative treatment of a toxic cloud containing aerosol droplets of HF by a sequential or concurrent drench of the toxic cloud with aqueous solutions. A first embodiment of the invention includes detection of HF vapor which alone, or in combination with secondary detection mechanisms, initiates a first water drench, a second drench of an aqueous solution containing a water soluble halogen compound, and third aqueous drench of a solution composed of (i) a foam generating surfactant (ii) a foam stabilizer and (iii) a phase transfer agent. This first embodiment includes the constant monitoring of the HF concentration during the drenching steps. In a second embodiment concentrated solutions of the second and third drenches are withdrawn from storage areas, by vacuum and then diluted with water prior to contact with the cloud.

DETAILED DESCRIPTION OF THE INVENTION

Figure 1:
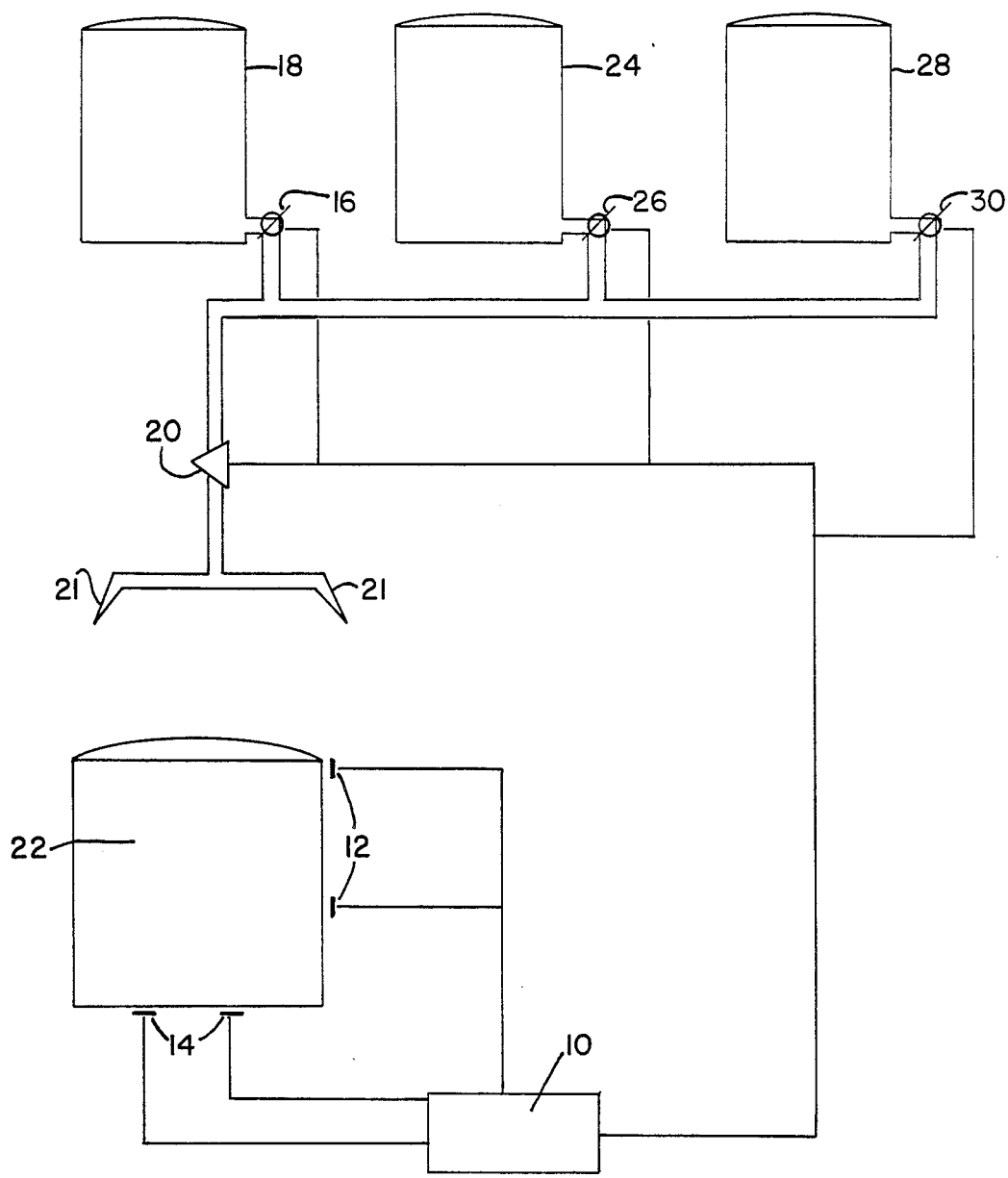
FIG. 1 is a schematic drawing of the apparatus in a first embodiment of the invention.

An HF-alkylation acid composition is composed of about 88% HF, 6.5% acid-soluble oils, 4% $C_3/C_4$ alkylate and 1.5% water. When such a composition escapes, or is accidentally released to the atmosphere, in large amounts from an alkylating unit, an aerosol cloud will form instantaneously. It is estimated that the cloud will be made up of about 70 to 88% of HF aerosol droplets of a size in the range of 0.5 to 5.0. The hydrocarbon component of this composition will hamper the ability to contain and neutralize such an aerosol cloud because a good portion of the HF droplets will be trapped by the hydrocarbons. The qualitative drenching of the HF cloud by the method of this invention will ensure that even the trapped HF droplets can be contained and neutralized.

The first step of the first embodiment of the method requires the detection of escaping HF. Because a vapor cloud will form instantaneously, when HF is released from an alkylating unit to the atmosphere, the presence of HF should be detected as quickly as possible. To ensure early detection, primary HF detectors are located in areas where such a leak is most likely to develop. At a minimum the HF detectors are placed about the top periphery of the storage tank or tower containing the alkylation acid and about a mid-portion of such a storage facility. The detectors are also located at weld seams, pipe connections, valve connections and generally along pipes and joints of the conduit system used for transporting the HF-alkylation acid to the alkylating reactor.

The primary HF detectors detect the presence of HF in amounts of at least 20 ppm which is an amount determined by the National Institute of Occupational Safety and Health to be "immediately dangerous to life and health" if one is exposed to such a concentration for 30 minutes. As little as 50 ppm is deemed to be a lethal dose.

Primary HF detectors, such as the devices disclosed and claimed in U.S. Pat. No. 4,552,624, herein incorporated by reference, can be used in the method of the invention to detect an HF leak.

Although it is possible that the primary HF detectors could monitor an initial HF leak and transmit such data to a computer, which then activates the drenching steps of the invention, additional electro-mechanical devices, as secondary detectors, are used in combination with the primary HF detectors to determine and verify that a massive leak (i.e., a leak which could escape as a toxic cloud beyond the confines of the alkylation unit, as compared to a small leak, which quickly dissipates on release to the atmosphere), is occurring. The secondary detectors monitor the temperature of the walls of the tank and the pressure within the tank and feed lines. A sudden large-scale change in monitored parameters will indicate a massive leak.

As shown in FIG. 1, computer 10 oversees the collection of the data from primary HF detectors 12 and secondary detectors 14, and when the accumulated data indicates that a massive leak is taking place, such as by pressure and temperature changes, which are associated with such a leak, computer 10 will activate the drenching steps, and control the timing of such steps. Such a primary/secondary detection means prevents false alarms, and may save hundreds of thousands of gallons of drench solutions.

Once a massive leak has been detected, the computer 10 activates the drenching steps. As seen in FIG. 1, in a first step, the computer opens valve 16 and water from a nearby storage tank 18, or other supply is pumped by pump 20 at a rate of about 8,000 gals/min to spray nozzles 21 located above and surrounding, for example, the alkylation-acid storage unit 22. This first water drench could conceivably contain the entire forming HF cloud. However, in the event of a massive leak, i.e., a leak capable of forming a toxic cloud which can not be contained within the confines of the alkylating unit, a water drench is not generally capable of removing the entire released HF. The water drench continues until it is determined by the computer from data supplied by the HF detectors that continued water application alone is no longer effective in removing HF. The water drench is then shut down or used in combination with the second drench step.

In order to contain and neutralize a greater portion of the HF cloud an aqueous drench containing an alkaline earth chloride is released concurrently with, or after, the initial water drench. Suitable aqueous solutions include solutions which contain at least one compound of the formula of $CaCl_2$, and $CaBr_2$. Preferred aqueous solutions contain $CaCl_2$.

Calcium chloride or calcium bromide will react with HF to form water-insoluble $CaF_2$ salts which are harmless. Hydrochloric acid is also produced in the reaction between $CaCl_2$ and HF, and the HCl produced can be neutralized by application of lime after containment of the HF cloud. The aqueous calcium chloride or bromide solutions contain between about 0.1 to 30 parts of the halogen compound per 100 parts of water, preferably 5 to 10 parts of the halogen compound per 100 parts of water. The second drench is also delivered to the area of the leak under control of computer 10 from a second on-site storage tank 24, by pump 20, to spray nozzles 21 at a rate of about 8,000 gal/min after the computer opens valve 26. If the presence of HF in large quantities is still being detected by the computer as it monitors the HF detectors, the third drench is activated by the computer either alone, or in combination with the first two drenches.

The third aqueous drench is composed of (i) at least one aqueous surfactant capable of generating a foam, (ii) a foam stabilizer and (iii) a phase transfer agent.

A non-limiting list of surfactants capable of generating a foam are disclosed in Kirk Othmer: Encyclopedia of Chemcial Technology, 3rd Edition, Volume 22, pages 332–386 which is herein incorporated by reference. The surfactants are present in concentrations of 0.01–50%, preferably 0.1–15%.

The foam stabilizer of the third drench is chosen for its ability to sustain the foam. A suitable, non-limiting, foam-sustaining component is a trialkylamine-N-oxide, of the formula

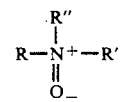

wherein R and R' and R" are the same or different and represent linear or branched $C_1$-$C_{18}$ alkyl groups. The trialkylamine-N-oxide is used in concentrations of between 0.01–50% and preferably between 0.05–15%.

The phase transfer agent of the third drench is a material which has the ability to traverse the boundaries of the hydrocarbon-aqueous interface and withdraw trapped acid from the hydrocarbon phase, transferring it to the aqueous foam, allowing for containment of remaining HF. Suitable phase transfer agents include 'onium salts, such as ammonium, phosphonium and arsonium species, and the polyethers, including polyethylene glycols, including derivatives thereof such as crowns, cryptates etc.

A non-limiting list of possible phase transfer agents include such 'onium salts as benzyltriethylammonium chloride, benzyltrimethylammonium chloride, benzyltrimethylammonium hydroxide, benzyltrimethylammonium methoxide, benzyltriphenylphosphonium chloride, didodecyldimethylammonium chloride, hexadecylbenzyldimethylammonium chloride, hexadecyldimethylethylammonium bromide, 1-hexadecylpyridinium bromide, hexadecyltributylphosphonium bromide, octadecylbenzyldimethylammonium chloride, tetramethylammonium chloride. A second non-limiting list of phase transfer agents include crown ethers such as Benzo-15-Crown-5 ($C_{14}H_{20}O_5$), 18-Crown-5 (1,4,7,10,13,16-hexaoxacyclooctadecane), Dibenzo-18-Crown-8 ($C_{20}H_{24}O_6$), dicyclohexano-18-Crown-6 ($C_{20}H_{38}O_6$), and cryptates, such as 1,10-Diaza-18-Crown-6 ($C_{12}H_{28}N_2O_4$), 4,7,13,16,21 Pentaoxa-1,10-diazabicyclo [8.8.8.]tricosane ($C_{15}H_{32}N_2O_5$), etc.

The third drench serves a plurality of purposes The foam will suppress the HF cloud; the foam, through its phase transfer component, will transfer the HF trapped within the hydrocarbon component of the alkylation acid to the aqueous phase, the foam stabilizer of the drench helps neutralize remaining HF, and the foam will also absorb toxic vapors.

The third drench is pumped, by pump 20, from on-site storage tanks 28, located within the vicinity of the alkylation unit, to spray nozzles 21, after the computer opens valve 30, at a rate of about 8,000 gals/min.

Once the cloud has been contained, i.e., knocked to the ground, the HCl produced is neutralized by manual applications of lime, and the solid $CaF_2$ formed is removed by mechanical means.

The order of release of the drenches is conducted in the most economic sequence possible, i.e., first the water drench is released then the alkaline earth chloride drench, and then the foam drench. However, the drenching steps of the invention can also be practiced by concurrently delivering the three drenches through the same or separate pipelines to a spill at individual rates of about 8,000 gal/min, or at a combined rate of about 8,000 gal/min.

A second embodiment of the invention also relates to a method for treating an HF alkylation acid spill. In this embodiment tank 24 contains a concentrated solution of $CaCl_2$, for instance the concentration may be a 50% concentrated solution of $CaCl_2$, and tank 28 contains a concentrated composition (e.g., 50%) of at least one surfactant, a foam stabilizer and a phase transfer agent.

Separate vacuum or aspirating pipes (not shown) are connected to tanks 24 and 28 and to a water supply line which is connected at one end to a water supply and at a second end to nozzles 21. The flow rate of the water passing through the supply line is regulated and the concentrated solutions are sucked into the supply line and diluted to desired concentration before passing from the water supply line to nozzles 21. Using concentrated solutions, of course, allows for greater drench storage capacity. The opening of the vacuum lines, and timing of their opening is controlled by the computer.

Although the invention has been described above with reference to specific embodiments, it should be apparent that changes and modifications may be made without departing from the spirit and scope of the invention. Accordingly, the invention is not limited by the foregoing description, but is only limited by the scope of the appended claims.

What is claimed:

1. A method for the containment of a vaporous cloud containing hydrofluoric acid which comprises the steps of;
   (a) drenching the cloud with a water drench;
   (b) drenching the cloud with an aqueous solution containing at least one compound of the formula of $CaCl_2$ and $CaBr_2$; and
   (c) drenching the cloud with a composition comprising at least one foam generating surfactant, a foam stabilizer for stabilizing the generated foam, and a phase transfer agent.

2. The method of claim 1 wherein said aqueous solution comprises $CaCl_2$.

3. The method of claim 1 which further comprises detecting the presence of an hydrofluoric acid in a vapor cloud formed by the escape of hydrofluoric-alkylation acid and performing steps (a), (b) and (c) upon such detection.

4. The method of claim 3 wherein the presence of hydrofluoric acid is detected with at least one primary hydrofluoric acid detector.

5. The method of claim 4 wherein the presence of hydrofluoric acid is further detected by changes in temperature and/or pressure in the equipment for transporting and storing said hydrofluoric-alkylation acid by secondary detectors.

6. A method for the containment of a vaporous cloud of hydrofluoric-alkylation acid catalyst which comprises the steps of:
   (a) detecting the presence of hydrofluoric acid present in said hydrofluoric-alkylation acid, and, upon such detection, then
   (b) drenching the cloud with a water drench;
   (c) drenching the cloud with an aqueous solution containing at least one compound of the formula of $CaCl_2$ and $CaBr_2$; and
   (d) drenching the cloud with a composition comprising at least one foam generating surfactant, a foam stabilizer for stabilizing the generated foam, and a phase transfer agent.

7. The method of claim 6 wherein said aqueous solution contains 0.1 to 30 parts by weight of $CaCl_2$ or $CaBr_2$ per 100 parts of water.

8. The method of claim 7 wherein said aqueous solution comprises $CaCl_2$.

9. The method of claim 6 wherein said drench composition comprising the at least one foam generating surfactant, the foam stabilizer, and the phase transfer agent further comprises water.

10. The method of claim 9 wherein said phase transfer agent is selected from the group consisting of ammonium and phosphonium salts and crown ethers.

11. The method of claim 10 wherein said foam stabilizer is a trialkylamine-N-oxide.

12. The method of claim 6 wherein drenching steps b-d are conducted sequentially.

13. The method of claim 6 wherein drenching steps b-d are conducted concurrently.

14. The method of claim 9 wherein said drench composition is contains a plurality of surfactants capable of generating a foam.

15. The method of claim 7 wherein said aqueous solution of at least one compound of the formula of $CaCl_2$ and $CaBr_2$ is prepared by diluting a concentrated solution of the same with water.

16. The method of claim 6 wherein said composition comprising the at least one surfactant, the foam stabilizer and the phase transfer agent is prepared by diluting a concentrated solution of the same with water.

* * * * *